United States Patent
Komatsu

(10) Patent No.: US 8,209,099 B2
(45) Date of Patent: Jun. 26, 2012

(54) DRIVE CONTROL APPARATUS FOR VEHICLE

(75) Inventor: Masaaki Komatsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1034 days.

(21) Appl. No.: 12/163,194

(22) Filed: Jun. 27, 2008

(65) Prior Publication Data

US 2009/0005931 A1 Jan. 1, 2009

(30) Foreign Application Priority Data

Jun. 28, 2007 (JP) ................. 2007-170617

(51) Int. Cl.
- G06F 7/00 (2006.01)
- G06F 17/00 (2006.01)
- G06F 19/00 (2011.01)

(52) U.S. Cl. ............... 701/69; 701/22; 701/36; 701/41; 701/54; 701/72

(58) Field of Classification Search ............ 701/22, 701/29, 69, 36, 41, 54, 72; 180/65.1, 205, 180/207

See application file for complete search history.

(56) References Cited

U.S. PATENT DOCUMENTS

| | | | |
|---|---|---|---|
| 5,453,930 A * | 9/1995 | Imaseki et al. | 701/22 |
| 2002/0153770 A1* | 10/2002 | Matsuno et al. | 303/146 |
| 2004/0204803 A1* | 10/2004 | Matsuda et al. | 701/22 |
| 2006/0048976 A1* | 3/2006 | Deguchi et al. | 180/6.5 |
| 2007/0021875 A1* | 1/2007 | Naik et al. | 701/1 |
| 2007/0050112 A1* | 3/2007 | Kroehnert et al. | 701/41 |
| 2007/0162203 A1* | 7/2007 | Yasutake et al. | 701/38 |
| 2007/0265758 A1* | 11/2007 | Miura | 701/72 |
| 2008/0071451 A1* | 3/2008 | Yamaguchi et al. | 701/69 |
| 2009/0127014 A1* | 5/2009 | Ushiroda et al. | 180/249 |

FOREIGN PATENT DOCUMENTS

| | | |
|---|---|---|
| EP | 1 466 775 | 10/2004 |
| JP | 09-086378 | 3/1997 |

* cited by examiner

Primary Examiner — Khoi Tran
Assistant Examiner — Jorge Peche
(74) Attorney, Agent, or Firm — Rankin, Hill & Clark LLP

(57) ABSTRACT

A drive control apparatus for a vehicle that improves vehicle maneuverability. The control apparatus performs control so as to reduce total drive torque of all wheels while maintaining a distribution difference, which is the difference between the drive torques of the left and right wheels during turning of the vehicle.

6 Claims, 4 Drawing Sheets

DRIVE CONTROL APPARATUS FOR VEHICLE

FIELD OF THE INVENTION

The present invention relates to a vehicular drive control apparatus that improves the maneuverability of a vehicle.

BACKGROUND OF THE INVENTION

A drive control apparatus for a vehicle designed to improve vehicle maneuverability by adjusting a drive torque of a drive source in accordance with a turning state of a vehicle is known from, for example, Japanese Patent Application Laid-Open Publication No. 09-86378 (JP 09-86378 A).

The vehicular drive control apparatus of JP 09-86378 A calculates the difference between a target yaw rate and an actually occurring yaw rate (yaw rate deviation), and when the yaw rate deviation exceeds a prescribed threshold, the apparatus calculates a transfer torque, and transfers the torque between the left and right rear wheels in an amount commensurate with the transfer torque. As a result, vehicle maneuverability improves because a yaw moment is generated in the vehicle.

The scheme for transferring torque to the left and right in this way while the vehicle is turning (a so-called scheme for adding turn assistance), may be a scheme for transferring torque between the left and right rear wheels, a scheme for transferring torque between the left and right front wheels, or a scheme for transferring torque between the left and right front and rear wheels.

The turning characteristics of a vehicle in the following usage examples will be discussed for a case in which the drive control system for a vehicle of the prior art is adopted in a general four-wheel-drive vehicle (a vehicle type in which the left and right front wheels and the left and right rear wheels are driven by using a drive source).

The first usage example is one in which only the front left and right wheels are driven and the rear wheels are not driven, i.e., there is no added turn assist from the rear wheels. Front wheel drive torque (forward drive torque) refers to drive torque for the front wheels.

The orientation of the wheels in relation to the forward direction of the vehicle shifts by a slip angle when a vehicle has been turned. Accordingly, the drive torque of the drive source is not directly transmitted from the front wheels to the road surface. As a result, the vehicle speed during a turn is reduced with respect to the speed of a vehicle traveling straight forward.

The second usage example is one in which the front right and left wheels are driven together with added turning assist from the rear wheels. The term "total drive torque" will be referred to as a drive torque for driving all the wheels. The total drive torque of the second usage example may be set to be the same as the drive torque for the front wheels (forward drive torque) of the first usage example.

Vehicle maneuverability is improved in the second usage example because torque is transferred between the left and right rear wheels in the manner of the drive control apparatus of JP 09-86378 A. When maneuverability is improved, the steering angle of the steering wheel may be small (vehicle handling is good) in comparison with the first usage example. The smaller the steering angle is, the smaller the wheel slip angle is in relation to the forward direction of the vehicle. Accordingly, the drive torque of the drive source readily transfers from the wheels to the road surface. As a result, the vehicle speed is not substantially reduced during a turn in relation to the vehicle speed during forward travel. Acceleration is even possible depending on the suspension setting.

In general, the greater the driving experience of the driver, the more likely it is that the driver will have as an empirical rule the relationship between the steering angle and the reduction in vehicle speed when a change is made from forward travel to turning. Accordingly, it is preferable that the vehicle speed during a turn should be reduced to an extent that the driver does not have an unpleasant sensation. Since the vehicle speed is not reduced during a turn as in the first usage example, there is room for improvement in increasing the driving energy efficiency during a turn.

SUMMARY OF THE INVENTION

An object of the present invention is to provide a technique that allows the speed of a vehicle during a turn to be reduced more appropriately while improving vehicle maneuverability, and allows greater drive energy efficiency during a turn.

According to an aspect of the present invention, there is provided a drive control apparatus for a vehicle whereby the vehicle is assisted in making a turn, the apparatus comprising: a controller for controlling the distribution of left-and-right wheel drive torque to left and right wheels during turning of the vehicle while maintaining a distribution difference, which is the difference in drive torque between the left and right wheels. A sum of drive torques from drive sources for driving all wheels is defined as a total drive torque. A sum of drive torques for driving prescribed left and right wheels, which is part of the total drive torque, is defined as the left and right wheel drive torque. The controller is performing control so as to reduce the total drive torque while maintaining the distribution difference during turning of the vehicle.

In this way, when a vehicle turns, total drive torque is reduced while a distribution difference that distributes torque to prescribed left and right wheels is maintained. Vehicle speed is reduced by reducing the total drive torque. Accordingly, when a vehicle turns, vehicle speed can be reduced to an extent that the driver does not have an unpleasant sensation while vehicle maneuverability is improved. Furthermore, the drive energy efficiency can be improved during a turn by reducing the total drive torque.

Preferably, the controller has turning state determination means for determining whether the turning state of the vehicle has exceeded minimum criteria, and the controller performs control so that the total drive torque is not reduced while the distribution difference is maintained even during turning of the vehicle when the turning state determination means has determined that a turning state has not exceeded prescribed minimum criteria. Here, the vehicle turning state is expressed, e.g., by the actual steering angle and vehicle speed. The term "minimum criteria" refers to a vehicle speed and a steering angle at which the driver does not have an unpleasant sensation. Accordingly, drive energy efficiency can be increased when a vehicle makes a turn.

Desirably, the controller has reduction drive torque setting means for setting the reduction drive torque in which the extent to which total drive torque is to be reduced is determined based on the distribution difference, and the reduction drive torque setting means increases the reduction drive torque in accordance as value of the distribution difference increases. Accordingly, stable vehicle maneuverability is obtained.

Preferably, the reduction drive torque setting means sets the reduction drive torque so as to reduce the vehicle speed detected by the vehicle speed detection means to a vehicle speed during a turn when the left and right wheels do not have the distribution difference. Accordingly, a smooth turn can be obtained.

In a preferred form, the vehicle has drive sources for independently driving a set of left and right wheels among the front and rear wheels, and also has a drive source for driving another set of the left and right wheels, and the controller calculates the distribution difference on the basis of the difference in the drive torque in the one pair of left and right wheels, and performs control so that the reduction drive torque set by the reduction drive torque setting means is reduced from the drive torque generated by the other drive source.

Desirably, the controller performs control so as to reduce the total drive torque by distributing, to the drive source of the one set of left and right wheels and the drive source of the other set of left and right wheels, the reduction drive torque in a range that does not reach a torque output limit of a drive source unit. Accordingly, the drive sources will drive smoothly without reaching an overload state.

According to another aspect of the present invention, there is provided a drive control method for a vehicle whereby the vehicle is assisted in making a turn, the method comprising the steps of: calculating a total drive torque by adding drive torques of drive sources for driving all the wheels; and calculating a left and right wheel drive torque by adding the drive torques for driving prescribed left and right wheels among the total drive torque. The method further comprising the steps of calculating a distribution difference, which is a difference in the drive torque between left and right wheels during turning of the vehicle; and performing control by the controller so that the left and right wheel drive torque is distributed to the left and right wheels while having a distribution difference. The controller performs control so as to reduce the total drive torque while maintaining a distribution difference during turning of the vehicle.

Preferably, the method further comprises a step for determining whether a turning state of the vehicle has exceeded minimum criteria, and the controller performing control so that the total drive torque is not reduced while the distribution difference is maintained during turning of the vehicle when the turning state is determined by the step to have not exceeded minimum criteria.

Desirably, the method further comprises a step for setting a reduction drive torque in which the extent to which total drive torque is to be reduced is determined based on the distribution difference, and the reduction drive torque being set so as to increase as the value of the distribution difference increases.

Preferably, the reduction drive torque setting step sets the reduction drive torque so that a vehicle speed detected by vehicle speed detection means is reduced to a vehicle speed during a turn when the left and right wheels have no distribution difference.

Desirably, the distribution difference is calculated based on the difference of the drive torque in a set of left and right wheels that are driven independently by the drive source, and the reduction drive torque (Td) thus set is subtracted from the drive torque generated by the drive source for driving the other pair of left and right wheels together.

In a preferred form, the total drive torque is reduced by distributing, to each of the drive sources of one set of left and right wheels and the drive source of the other set of left and right wheels, the reduction drive torque in a range that does not reach a torque output limit of a drive source unit.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
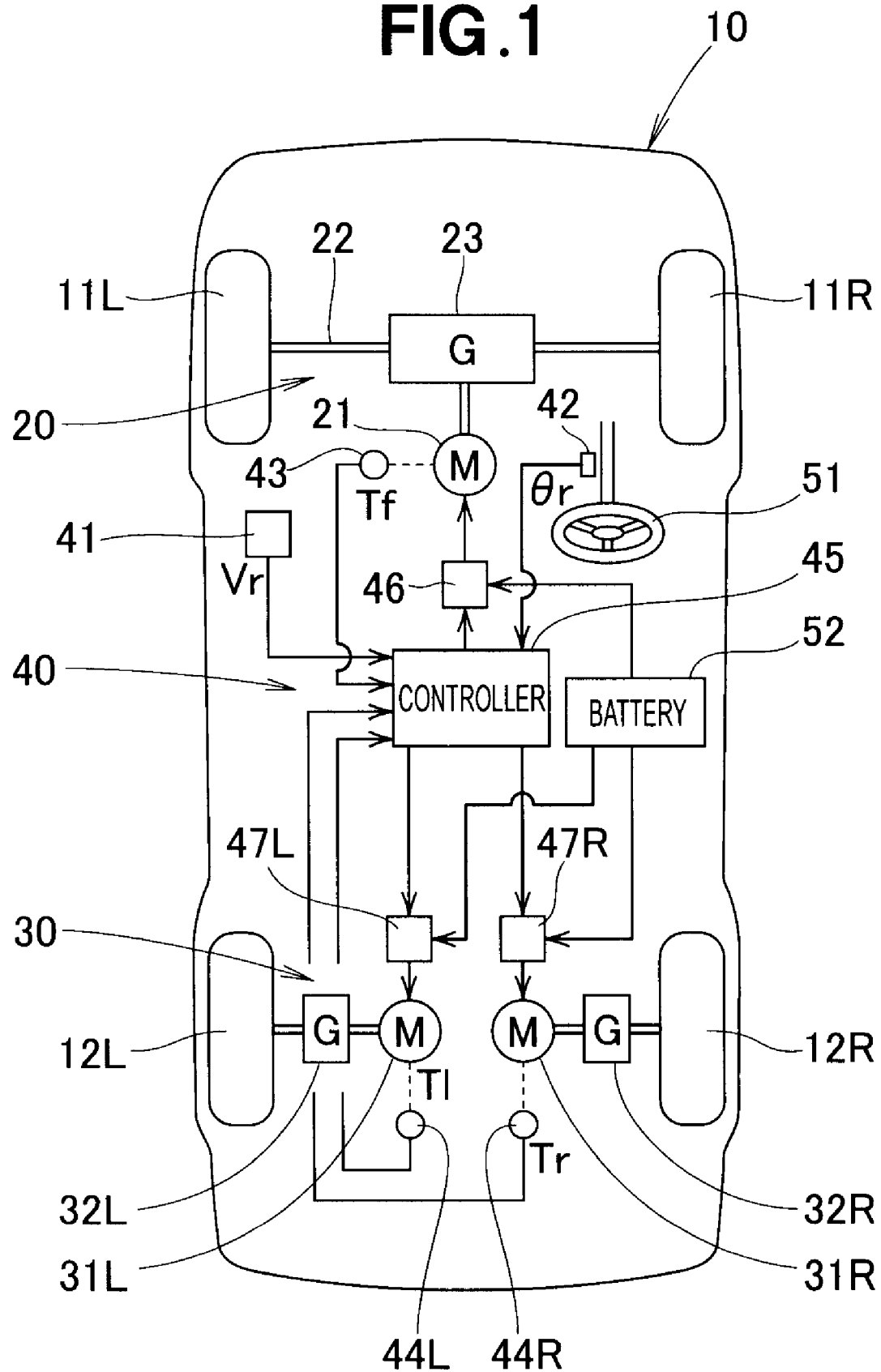
FIG. 1 is a schematic top plan view showing a vehicle employing a vehicular drive control apparatus according to the present invention.

A vehicle 10 is a so-called four-wheel-drive vehicle of the type in which left and right front wheels 11L and 11R and left and right rear wheels 12L, 12R are driven, as shown in FIG. 1. The vehicle 10 is provided with a front-wheel drive system 20 for driving the left and right front wheels 11L, 11R; a rear-wheel drive system 30 for driving the left and right rear wheels 12L, 12R; and a drive control apparatus 40 for a vehicle for drivably controlling the front- and rear-wheel drive systems 20, 30.

The front-wheel drive system 20 is composed of a front-wheel drive motor 21, and a front-side gear mechanism 23 for transmitting drive torque (front-side drive torque Tf) generated by the front-wheel drive motor 21 to the left and right front wheels 11L, 11R via an axle 22. The front-side gear mechanism 23 is composed of a differential gear.

The rear-wheel drive system 30 is composed of a left rear wheel motor 31L, a right rear wheel motor 31R, a left-side rear gear mechanism 32L for transmitting drive torque Tl (left rear drive torque Tl) generated by the left rear-wheel drive motor 31L to the left rear wheel 12L, and a right-side rear gear mechanism 32R for transmitting drive torque Tr (right rear drive torque Tr) generated by the right rear-wheel drive motor 31R to the right rear wheel 12R.

The motors 21, 31L, 31R may directly transmit drive torque to the wheels 11L, 11R, 12L, 12R without making use of the gear mechanisms 23, 32L, 32R.

The motors 21, 31L, 31R are drive sources composed of electric motors. Hereinafter, the front-wheel drive motor 21 is referred to as the "front motor 21," the left rear-wheel drive motor 31L is referred to as the "left rear motor 31L," and the right rear-wheel drive motor 31R is referred to as the "right rear motor 31R."

Here, the relationship between the drive torques Tf, Tl, Tr will be described next with reference to FIG. 2. However, the reference symbols Tt, Ta and ΔT are not depicted.

The term "total drive torque Tt" refers to the sum of the torque Tt of the front-side drive torque Tf, the left rear drive torque Tl, and the right rear drive torque Tr(Tt=Tf+Tl+Tr). The term "left and right wheel drive torque Ta" refers to the sum of the torque Ta of the left rear drive torque Tl and the right rear drive torque Tr(Ta=Tl+Tr). The term "distribution difference ΔT" refers to the absolute value ΔT of the difference between the left rear drive torque Tl and the right rear drive torque Tr(ΔT=|Tl−Tr|) generated in the left and right rear wheels when a vehicle is turning.

The total drive torque Tt is the drive torque for driving all wheels 11L, 11R, 12L, 12R. The front-side drive torque Tf, among the total drive torque Tt, is the forward-driving torque for the vehicle 10. The left and right wheel drive torque Ta, among the total drive torque Tt, is the drive torque for assisting a turn when the vehicle 10 is turned.

Twf is a forward drive torque for driving the left and right front wheels 11L, 11R when the vehicle 10 is traveling straight forward or turning. The forward drive torque Twf is distributed evenly to the left and right wheels 11L, 11R, and is based on the front-side drive torque Tf generated by the front-wheel drive motor 21.

Twl is a turning drive torque for driving the left rear wheel 12L during turning of the vehicle 10. The left turning drive torque Twl is based on the left rear drive torque Tl generated by the left-rear-wheel drive motor 31L.

Twr is a turning drive torque for driving the right rear wheel 12R during turning of the vehicle 10. The right turning drive torque Twr is based on the right rear drive torque Tr generated by the right-rear-wheel drive motor 31R.

The drive control apparatus 40 for a vehicle acquires a distribution difference ΔT generated during turning of the vehicle 10, and performs control so as to assist the turning of the vehicle 10 by controlling distribution with the aid of the controller 45 so as to distribute the left and right wheel drive torque Ta to the left and right wheels 12L, 12R, as shown in FIG. 1. The drive control apparatus 40 for a vehicle will hereinafter simply be referred to as "drive control apparatus 40." The drive control apparatus 40 is composed of, e.g., a vehicle speed detector 41, a steering wheel angle detector 42, a plurality of torque detectors 43, 44L, 44R, a controller 45, and driver circuits 46, 47L, 47R.

The vehicle speed detector 41 detects a travelling speed Vr (vehicle speed Vr) of a vehicle 10. The vehicle speed detector 41 may be one that calculates the vehicle speed Vr on the basis of an average value of the rotational speed of the wheels 11L, 11R, 12L, 12R. For example, it is possible to provide a vehicle 10 with a plurality of wheel speedometers, to individually measure the rotational speed of the wheels 11L, 11R, 12L, 12R via the wheel speedometer units, and to calculate the vehicle speed Vr on the basis of the average value of the rotational speed of the wheel speedometers.

The steering wheel angle detector 42 detects the steering angle θr of the steering wheel 51 (including the steering direction). The left and right front wheels 11L, 11R are steered by steering the steering wheel 51.

Each of the plurality of the torque detectors 43, 44L, 44R individually detects the drive torque of the motors 21, 31L, 31R, and is composed of, e.g., a magnetostrictive sensor for noncontact measurement of the drive torque exerted on the motor axle. Specifically, the front torque detector 43 detects the drive torque Tf of the front motor 21. The left rear torque detector 44L detects the drive torque Tl of the left rear motor 31L. The right rear torque detector 44R detects the drive torque Tr of the right rear motor 31R.

Each of the plurality of torque detectors 43, 44L, 44R may individually measure the drive torques on the basis of drive electric current values that are supplied to the motors 21, 31L, 31R. In this way, when the plurality of torque detectors 43, 44L, 44R for indirectly calculating the drive torques is adopted, detectors for directly detecting the drive torques become unnecessary.

The drive controller 45 receives the detection signals Vr, θr, Tf, Tl, Tr, . . . from the vehicle speed detector 41, the steering angle detector 42, the torque detectors 43, 44L, 44R, the yaw rate detector (not depicted) and the like, and individually drivably controls the motors 21, 31L, 31R by sending control signals to the driver circuits 46, 47L, 47R. The driver circuits 46, 47L, 47R supply electric currents for driving to the motors 21, 31L, 31R from the battery 52 in accordance with to the control signals of the controller 45.

The controller 45 performs control so as to reduce the total drive torque Tt while maintaining the distribution difference ΔT of the drive torques Tl, Tr during turning of the vehicle 10.

Next, the control flow for a case in which the drive controller 45 is a microcomputer will be described on the basis of FIG. 3 with reference to FIGS. 1 and 2. FIG. 3 shows an example of a motor drive control routine executed by a controller 45 shown in FIG. 1. The motor drive control routine shown in FIG. 3 is executed repeatedly at each prescribed cycle.

First, in step (hereinafter abbreviated as ST) 01, the vehicle speed Vr is read from the vehicle speed detector 41, the steering angle θr is read from the steering wheel angle detector 42, and the drive torques Tf, Tl, Tr are read from the torque detectors 43, 44L, 44R.

Next, a determination is made whether the detected actual steering angle θr has exceeded a prescribed minimal reference angle θs (ST02), and a determination is made whether a detected actual vehicle speed Vr has exceeded a prescribed minimum reference vehicle speed Vs (ST03). When both values θr or Vr are equal to or less than the reference values θs, Vs, a reduction drive torque Td is set to 0 (ST04). The steps ST02 and ST03 function as steps for determining a turning state of the vehicle.

The minimum reference steering angle θs is set to a steering angle at which the driver does not have an unpleasant sensation when the vehicle 10 has turned. The minimum reference vehicle speed Vs is set to a vehicle speed at which the driver does not have an unpleasant sensation when the vehicle 10 has turned. The reason for this is that the driver will not have an unpleasant sensation when the steering angle θr and the vehicle speed Vr are low, and the effect of improving drive energy efficiency during a turn is small.

When the inequalities θr>θs and Vr>Vs are true, the absolute value ΔT, which is the difference between the left rear drive torque Tl and the right rear drive torque Tr, is computed (ΔT=|Tl−Tr|) and the absolute value ΔT is set as the distribution difference ΔT of the left and right wheel drive torque Ta (ST05).

Next, the reduction drive torque Td, which corresponds to the actual distribution difference ΔT, is set based on the reduction drive torque setting map (ST06). The ST06 functions as reduction drive torque setting means. The reduction drive torque Td calculated in this case is a value that is greater than 0. The reduction drive torque setting map is described in FIG. 4.

Next, the reduction drive torque Td, which was set in ST04 or ST06 described above, is taken into account to set the drive torques being controlled during a turn, i.e., the target drive torques Tfr, Tlr, Trr (ST07). The ST07 functions as target drive torque means.

Specifically, the front side target drive torque Tfr, which is the target of control during a turn, is set to a value in which the reduction drive torque Td is subtracted from the detected actual front-side drive torque Tf(Tfr=Tf−Td). The left rear target drive torque Tlr, which is the target of control during a turn, is set to a value that is equal to the detected actual left rear drive torque Tl(Tlr=Tl). The right rear target drive torque Trr, which is the target of control during a turn, is set to a value which is equal to the detected actual right rear drive torque Tr(Trr=Tr).

Since Tlr=Tl and Trr=Tr as described above, the following relationship holds true: ΔT=|Tl−Tr|=|Tlr−Trr|. In other words, the value of the target ΔT is equal to the actual distribution difference ΔT.

Lastly, the motors 21, 31L, 31R are individually driven and controlled (ST08) on the basis of the target drive torques Tfr, Tlr, Trr which have been set, and the control by the motor drive control routine shown in FIG. 3 is ended.

Figure 4:
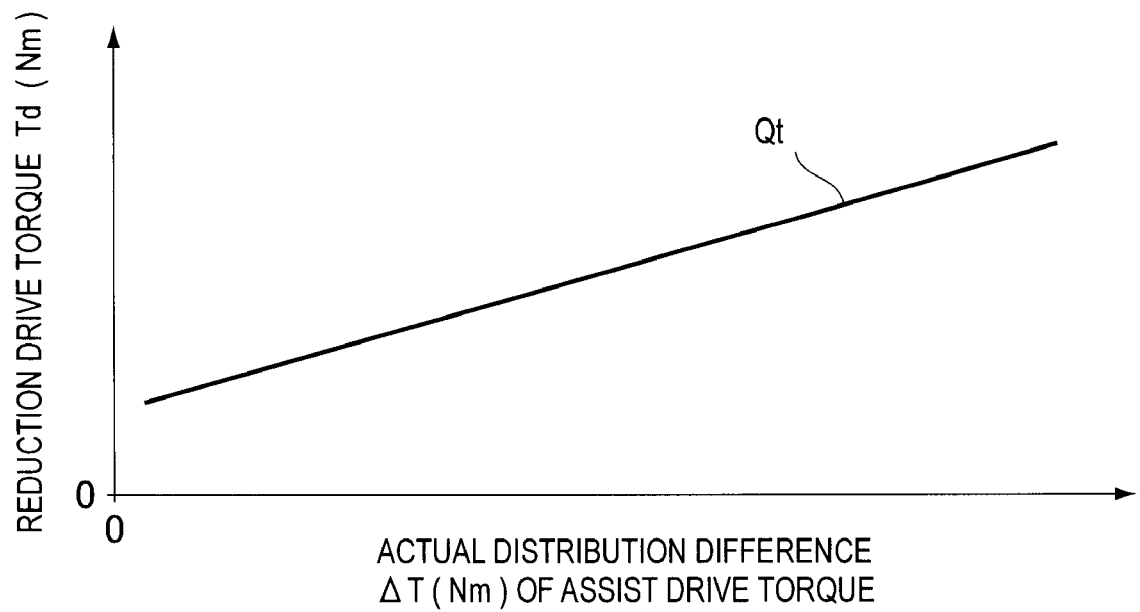
FIG. 4 is a graph showing a mapping of the reduction drive torque setting according to the present invention.

Next, the reduction drive torque setting map used in the step ST06 will be described with reference to FIG. 4. FIG. 4 is a graph showing a reduction drive torque setting map according to the present invention, wherein the horizontal axis shows the actual distribution difference ΔT(Nm) of the left and right wheel drive torque, and the vertical axis shows the reduction drive torque Td(Nm). The graph shows a reduction drive torque setting map for obtaining the reduction drive torque Td that corresponds to the actual distribution difference ΔT.

The straight line headed upward to the right in the graph is the reduction drive torque setting characteristics line Qt, according to which the reduction drive torque Td increases with increased actual distribution difference ΔT. The reduction drive torque setting characteristics line Qt is used as a reduction drive torque settings map.

Next, a usage example in which the vehicle 10 is turned will be described with reference to FIG. 2. The usage example is a one in which the left and right front wheels 11L, 11R are driven, and further, a turning assist is added by the left or the right rear wheels 12L, 12R.

Figure 2:
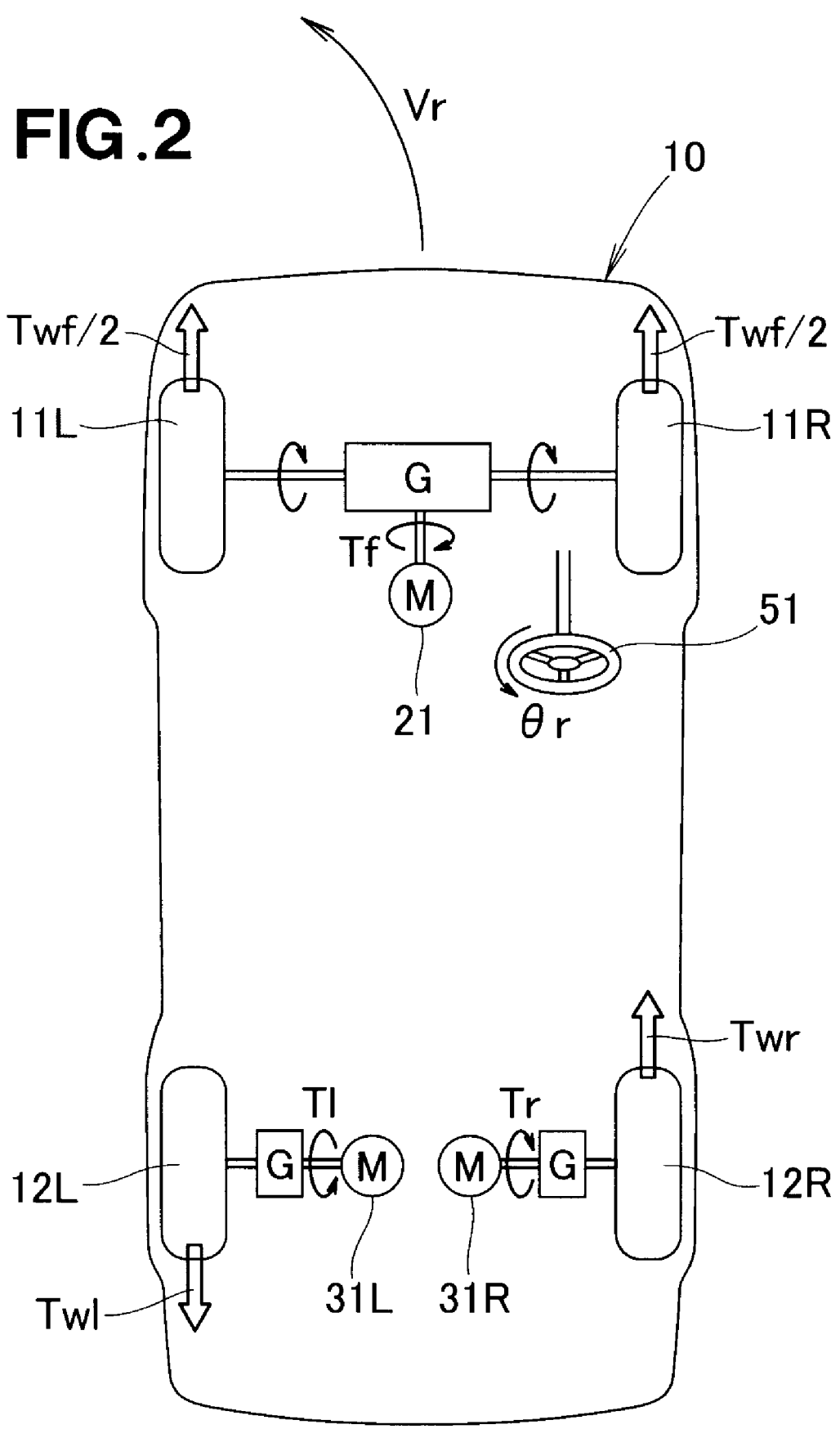
FIG. 2 is a schematic top plan view showing the vehicle with motors of FIG. 1.
Figure 3:
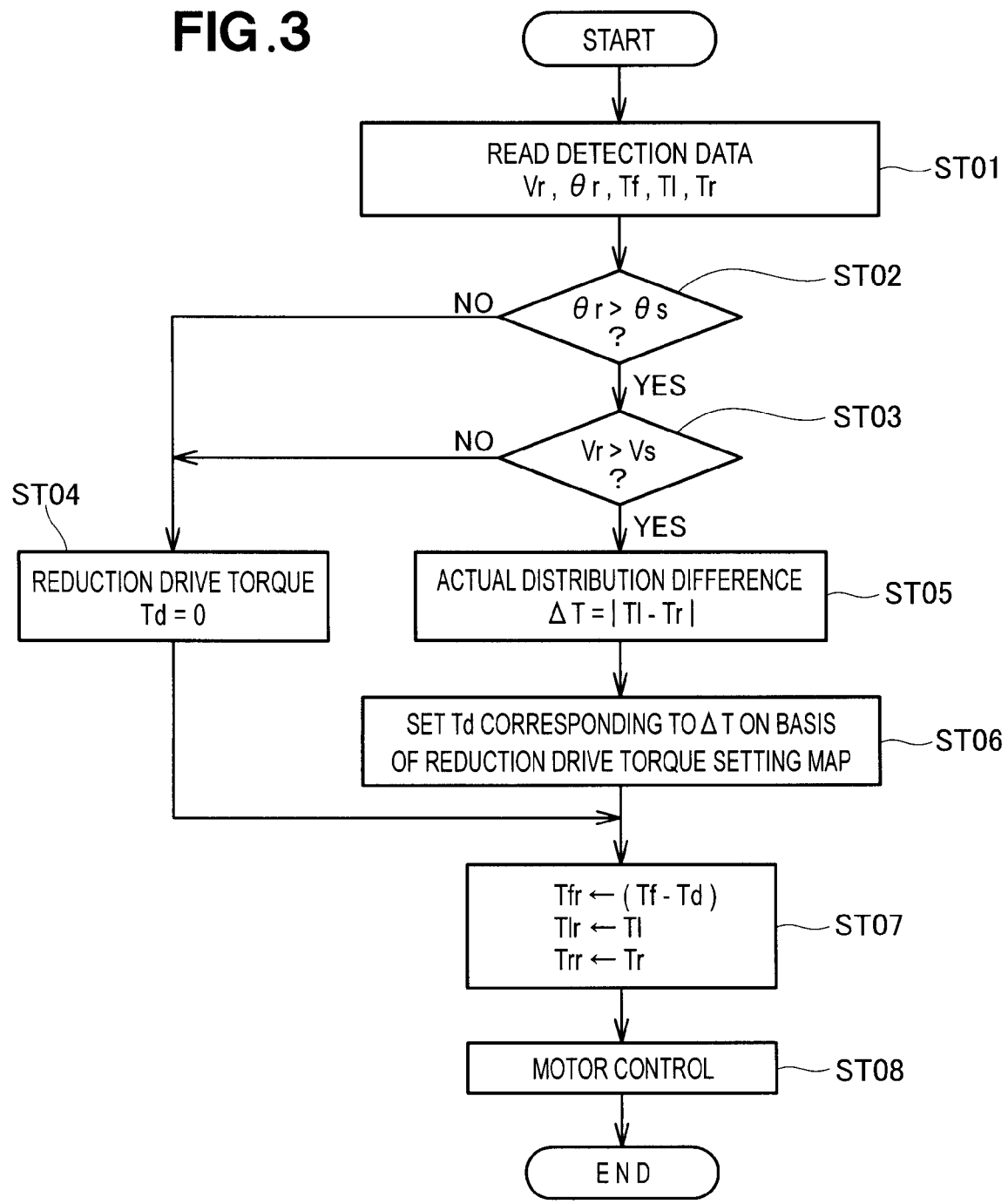
FIG. 3 is a control flowchart showing an example of a motor drive control routine performed by the controller shown in FIG. 1.

When the vehicle 10 is turned left, the left rear wheel 12L is the inner turning wheel among the turn-assisting left and right rear wheels 12L, 12R, and the right rear wheel 12R is the outer turning wheel, as shown in FIG. 2. The left rear wheel 12L is driven in an opposite direction by the left turning drive torque Twl, and the right rear wheel 12R is driven in a forward direction by the right turning drive torque Twr. As a result, the maneuverability of the vehicle 10 is improved because a yaw moment is generated in the vehicle 10.

The steering angle θr of the steering wheel 51 may be small (vehicle handling is good) because of the improved maneuverability of the vehicle 10. The smaller the steering angle θr is, the smaller the slip angle of the front wheels 11L, 11R can be in relation to the forward direction of the vehicle 10. Accordingly, the front-side drive torque Tf (i.e., the forward drive torque Twf) of the front motor 21 is readily transferred from the front wheels 11L, 11R to the road surface. As a result, the speed of the maneuvering vehicle Vr is not considerably reduced in relation to the forward direction of the vehicle. Acceleration is even possible depending on the suspension setting.

In contrast, in accordance with the drive control apparatus 40 for a vehicle of the present invention, the total drive torque Tt can be reduced while the distribution difference ΔT at which torque is distributed to prescribed left and right wheels, i.e., the rear wheels 12L, 12R, during turning of the vehicle 10 (see ST05 through ST07 shown in FIG. 3) is maintained.

Regarding the reduction of the total drive torque Tt, the forward drive torque Tf (front-side drive torque Tf) alone is reduced by an amount commensurate with the reduction drive torque Td (see ST07). The reason for this is as follows.

For example, consider the moment when the left rear motor 31L, which is the inner side of the turn, generates the left rear drive torque Tl in the direction opposite to the forward direction of the vehicle, as shown in FIG. 2. When the left rear drive torque Tl in the opposite direction is further reduced by an amount commensurate with the reduction drive torque Td, the left rear motor 31L may reach an output limit. In order to avoid this type of situation, the reduction drive torque Td is subtracted from the front-side drive torque Tf.

It is apparent from the above description that the vehicle speed Vr is reduced by reducing the total drive torque Tt. Accordingly, the vehicle speed Vr can be reduced to an extent that the driver does not have an unpleasant sensation, while the maneuverability of vehicle 10 is improved during a turn.

Furthermore, the drive energy efficiency can be improved during a turn by reducing the total drive torque Tt.

The drive control apparatus 40 for a vehicle according to an embodiment of the present invention can be applied regardless of the number of wheels mounted on the vehicle 10, and can be applied to a vehicle that has a controllable left and right drive wheel difference.

The drive control apparatus 40 for a vehicle can use a combination of the four wheels 11L, 11R, 12L, 12R to assist in a turn by optimally transferring the left and right wheel drive torque Ta to the two sets of the left and right front wheels 11L, 11R and the left and right rear wheels 12L, 12R. For example, application can also be made to a vehicle in which the distribution ratio of the total drive torque Tt in relation to the front side and the rear side can be freely varied while the vehicle 10 is travelling.

It is particularly preferred that the total drive torque Tt during a turn be reduced until the value of the vehicle speed Vr falls below "the vehicle speed for a case in which a conventional vehicle makes a turn." The term "conventional vehicle" refers to a vehicle without turn assist, i.e., a common vehicle that is not provided with a drive torque distribution difference to the left and right drive wheels during a turn. In this way, the total drive torque Tt is reduced, whereby a turn assist is realized that reduces an unpleasant sensation to the driver.

The drive control apparatus 40 for a vehicle can also be applied to a vehicle in which the total drive torque Tt can be reduced to any extent as long as the vehicle speed Vr is in a range that does not give the driver an unpleasant sensation during a turn (a vehicle of a type that has no limitation whereby the vehicle speed is reduced only to a vehicle speed at which there is no turn assist).

The steering scheme of vehicle 10 may be a scheme wherein the left and right rear wheels 12L, 12R are steered by steering the steering wheel 51. When this scheme is adopted, the left and right front wheels 11L, 11R may be driven by the left and right wheel drive torque Ta, and the left and right rear wheels 12L, 12R may be driven by the forward drive torque Tf (front-side drive torque Tf).

The combination of a plurality of drive sources 21, 31L, 31R in relation to the plurality of wheels 11L, 11R, 12L, 12R is arbitrary. For example, a configuration is possible in which the left and right wheels 11L, 11R are each driven by individual drive sources, and the left and right rear wheels 12L, 12R are driven by a single drive source. Alternatively, a configuration is possible in which four drive sources are provided, and the four wheels 11L, 11R, 12L, 12R are each driven by individual drive sources.

The vehicle 10 may also have a configuration in which the left and right rear wheels 12L, 12R are driven by the forward drive torque Tf (front-side drive torque Tf ) and the left and right front wheels 11L, 11R are driven by the left and right wheel drive torque Ta. In this instance, it is preferred that reduction occur from the left rear and right rear motors 31L, 31R in an amount commensurate with the reduction drive torque Td when the total drive torque Tt is reduced.

The motors that generate left and right wheel drive torque Ta among the motors (drive sources) 21, 31L, 31R may generate "forward-driving torque for the vehicle 10."

When the vehicle 10 is turning and the total drive torque Tt from the plurality of motors 21, 31L, 31R is reduced, the configuration may be one in which any of the motors is suitably selected and the torque is reduced by an amount commensurate with the reduction drive torque Td as long as the motors 21, 31L, 31R are individually in a range in which an output limit has not been reached.

The configuration may be one in which torque is reduced in accordance with the output balance of the each of the motors 21, 31L, 31R when the vehicle 10 is turning and the total drive torque Tt from a plurality of motors 21, 31L, 31R is reduced.

The drive sources 21, 31L, 31R are not limited to being electric motors, and may be, e.g., engines.

When the drive sources 21, 31L, 31R are electric motors, the motors can be composed of in-wheel motors. The electric motors may be configured so as to be disposed on the upper side of a suspension spring and to transmit drive torque to the wheels 11L, 11R, 12L, 12R via drive shafts.

When the drive sources 21, 31L, 31R are electric motors, the energy source for the electric motors is not limited to a battery 52, but may, e.g., be a fuel cell or an electric generator.

The controller 45 is not limited to a microcomputer configuration.

The reduction drive torque Td that is set in ST06 shown in FIG. 3 is not limited to being set using the reduction drive torque settings map shown in FIG. 4, and may be set by a computing equation, for example.

The controller 45 may be configured to control the reduction in total drive torque Tt while maintaining the distribution difference ΔT of the drive torques Tl, Tr during turning of the vehicle 10.

Accordingly, in the control flow chart shown in FIG. 3, the actual distribution difference ΔT is calculated (ST05) in accordance with the values of the steering angle θr and the vehicle speed Vr (ST02, ST03), but no limitation is imposed thereby.

For example, the actual distribution difference ΔT may be calculated (ST05) regardless of the values of the steering angle θr and the vehicle speed Vr. In this instance, ST02 through ST04 are unnecessary.

The actual distribution difference ΔT may be calculated (ST05) in accordance with the lateral acceleration value or the yaw rate value in place of the steering angle θr and the vehicle speed Vr.

An open loop feed forward control scheme may be used as the control scheme in ST12 shown in FIG. 3, because the reduction drive torque Td (targeted value) is set corresponding to the distribution difference ΔT on the basis of the reduction drive torque setting map in ST06. Open loop control refers to a control system in which only command values are given to the motor, and the output of the control target is not provided as feedback.

The control scheme in ST08 is not limited to the control scheme described above, and, e.g., an error (deviation) drive-type feedback control scheme may be used. When this control scheme is used, a prescribed vehicle speed (target vehicle speed) Vo as the target is calculated in advance, and the error between the target vehicle speed Vo and the actual vehicle speed Vr is calculated (ΔV=Vo−Vr). The error ΔV is used as the control input value, and the motors 21, 31L, 31R can be individually driven and controlled based on the input value ΔV.

Obviously, various minor changes and modifications of the present invention are possible in light of the above teaching. It is therefore to be understood that within the scope of the appended claims the invention may be practiced otherwise than as specifically described.

What is claimed is:

1. A vehicular drive control method for assisting a vehicle in making a turn, the method comprising the steps of:
   calculating a total drive torque by adding drive torques of drive sources for driving front and rear wheels;
   calculating a left and right wheel drive torque by adding the drive torques for driving left and right rear wheels or left and right front wheels among the total drive torque;
   calculating a distribution difference, which is a difference in the drive torque between the left and right rear wheels or left and right front wheels during turning of the vehicle; and
   performing control by the controller so that the left and right wheel drive torque is distributed to the left and right rear wheels or left and right front wheels while having the distribution difference, wherein the controller performs control so as to reduce the total drive torque while maintaining the distribution difference during turning of the vehicle.

2. The control method of claim 1, further comprising the step of determining whether a turning state of the vehicle has exceeded minimum criteria, wherein the controller performing control so that the total drive torque is not reduced while the distribution difference is maintained during turning of the vehicle when the turning state of the vehicle is determined by the step to have not exceeded the minimum criteria.

3. The control method of claim 1, further comprising the step of setting a reduction drive torque in which the extent to which total drive torque is to be reduced is determined based on the distribution difference, wherein the reduction drive torque being set so as to increase as the value of the distribution difference increases.

4. The control method of claim 3, wherein the reduction drive torque setting step sets the reduction drive torque so that a vehicle speed detected by vehicle speed detection means is reduced to a vehicle speed during a turn when the left and right wheels have no distribution difference.

5. The control method of claim 3, wherein the distribution difference is calculated based on the difference of the drive torque in a set of left and right wheels that are driven independently by the drive sources, and the reduction drive torque thus set is subtracted from the drive torque generated by the drive source for driving the other pair of left and right wheels together.

6. The control method of claim 5, wherein the total drive torque is reduced by distributing, to each of the drive sources of one set of left and right wheels and the drive source of the other set of left and right wheels, the reduction drive torque in a range that does not reach a torque output limit of a drive source unit.

* * * * *